United States Patent
Mohaghegh (10) Patent No.: US 9,964,131 B1
(45) Date of Patent: May 8, 2018

(54) METHODS AND APPARATUSES FOR PROVIDING CORROSION PROTECTION TO JOINED SURFACES

(71) Applicant: THE BOEING COMPANY, Chicago, IL (US)

(72) Inventor: Mohssen Mohaghegh, Mukilteo, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days. days.

(21) Appl. No.: 15/581,553

(22) Filed: Apr. 28, 2017

(51) Int. Cl.
*F16B 5/00* (2006.01)
*F16B 1/00* (2006.01)

(52) U.S. Cl.
CPC .... *F16B 5/0004* (2013.01); *F16B 2001/0085* (2013.01)

(58) Field of Classification Search
CPC ...... F16B 5/0004; B64C 1/069; B29C 66/128
See application file for complete search history.

(56) References Cited

U.S. PATENT DOCUMENTS

| | | | | |
|---|---|---|---|---|
| 3,879,916 A | * | 4/1975 | Bigham | F16B 5/0072 403/385 |
| 3,925,956 A | * | 12/1975 | Atkinson | B64C 1/12 403/217 |
| 7,115,323 B2 | | 10/2006 | Westre et al. | |
| 7,837,148 B2 | | 11/2010 | Kismarton et al. | |
| 8,544,176 B2 | * | 10/2013 | Delort | B64C 3/26 244/119 |
| 9,314,875 B2 | * | 4/2016 | Stephan | B23K 26/24 |
| 9,315,254 B2 | | 4/2016 | Walker et al. | |
| 2010/0078964 A1 | * | 4/2010 | Wylezinski | B62D 33/046 296/186.1 |
| 2013/0037655 A1 | * | 2/2013 | Bradley | B64C 3/26 244/124 |
| 2014/0064877 A1 | * | 3/2014 | Molinier | F16B 33/00 411/337 |
| 2014/0131518 A1 | | 5/2014 | Lin et al. | |
| 2016/0318594 A1 | * | 11/2016 | Paul | B64C 1/069 |

* cited by examiner

Primary Examiner — Daniel J Wiley
(74) Attorney, Agent, or Firm — Coats & Bennett, PLLC (57) ABSTRACT

Methods, systems and apparatuses are disclosed for joining assemblies, particularly joints and joining assemblies for co-joining composite components and metal components in a joining assembly, and inhibiting corrosion of metal components secured to composite component via a joining assembly.

20 Claims, 4 Drawing Sheets

METHODS AND APPARATUSES FOR PROVIDING CORROSION PROTECTION TO JOINED SURFACES

TECHNOLOGICAL FIELD

The present disclosure relates generally to joints, joint assemblies and methods for joining structures. More specifically, the present disclosure also relates to butt joints, butt joint assemblies and methods for joining dissimilar materials and providing corrosion protection to joined materials. Still more specifically, the present disclosure also relates to butt joints, butt joint assemblies and methods for joining dissimilar materials and providing corrosion protection to joined materials in aircraft and vehicle structures.

BACKGROUND

Joint assemblies on structures, particularly aircraft and other vehicle structures and assemblies often join components made from dissimilar materials. For example, joint assemblies typically operate to join components made from similar or dissimilar materials. When dissimilar materials are to be joined, composite materials may, for example, be joined to metal-containing components. When joining components made from dissimilar materials, such as a component made from a composite material joined to a component made from a metal such as, for example, aluminum, a large difference in electrical potential is created. Such differential in electrical potential can increase the probability of corrosion of, for example, aluminum, especially when oriented proximate to composite components having exposed carbon fibers edges. Any flaws in the edges or ends of the composite material or the sealant covering the edges or ends can exacerbate the collection of, or otherwise serve as sites to retain moisture that may build up within joints used to connect the components (e.g. butt joints). Such moisture that is then subjected to varying temperatures can potentially degrade the ends or edges of an exposed composite component. Moreover, if moisture is allowed to remain in contact with ends or edges of joined metal components, such as aluminum components, corrosion can occur.

In the aerospace field, including the manufacture of aircraft, it may be desired to join composite components with metal components via joining assemblies. The joining of dissimilar components can offer particular advantages, as the properties of both materials may be desirable for a particular assembly.

The joining of dissimilar components in a joint assembly can present challenges as the dissimilar materials may react differently to various environment conditions. For example, the dissimilar materials may react differently to moisture build-up that could lead to the corrosion of the metal components. While the CFRPs themselves demonstrate good corrosion resistance, moisture may build up and present undesirable effects at and within a joint assembly. Structures comprising joined assemblies can experience wide ranging temperatures that can lead to degradation of certain mechanical properties of the CFRPs, such as, for example, at the matrix-fiber interface and at the edges of the composite components where the fibers may be exposed to and retain amounts of moisture. When composite components are joined in close proximity to metal components, such as in a common joint (e.g. joining of dissimilar materials), even though the CFRPs themselves may not be affected by the moisture present, the carbon fibers in the CFRPs can contribute to galvanic corrosion in the commonly-joined metal components.

Galvanic corrosion is caused by dissimilar metals and alloys have different electrode potentials coming into contact through an electrolyte (e.g. moisture/water, especially if salt or industrial pollutants are present) with one metal acting as anode and the other metal acting as a cathode. The electrode potential difference between the dissimilar metals results in an accelerated attack on the anode member of the galvanic couple. The anode metal dissolves into the electrolyte, and a deposit collects on the cathodic metal. In the case of moisture build-up, water can become an electrolyte, thereby providing a means for ion migration whereby metallic ions move from the anode to the cathode within the electrolyte. This leads to the metal at the anode corroding more quickly than it otherwise would and corrosion at the cathode being inhibited.

Such corrosion, including galvanic corrosion of joined metal components, can necessitate the replacement of such metal components, resulting in increased cost as the structure comprising the corroding metal component must be removed from service while the metal component is serviced or replaced.

SUMMARY

Improved methods of joining components made from materials where at least one of the joined components may corrode in the presence of moisture, or methods that isolate moisture from contacting such components, as well as improved joints for assisting in the corrosion inhibition of such components, would be advantageous.

Methods and apparatuses are disclosed using joints and joining assemblies to join components, particularly joints and joint assemblies for joining composite components and metal components, and inhibiting corrosion of metal components secured via a joint assembly to a composite component. For the purposes of this application, the terms "joint", "joint assembly" and "joining assembly" are equivalent terms that can be used interchangeably. The present disclosure contemplates the manufacture of aircraft joints that join composite components, including CFRP-containing components to metal components, including, for example, aluminum and aluminum alloy-containing components via a joining assembly comprising joints. Such contemplated joints and joining assemblies include high-strength materials including, for example, titanium-containing and titanium alloy-containing fittings and fasteners.

According to an aspect of the present disclosure, a method is disclosed for joining a composite component to a metal component via a joining assembly (e.g. butt joint) comprising positioning a composite component in a first plane, with the composite component comprising a composite component first end, and a composite component second end; substantially covering said composite component first end with a composite edge seal; positioning a metal component in said first plane or in a second plane, with the metal component having a metal component first end and a metal component second end, wherein the second plane may be aligned with the first plane; positioning the composite component first end proximate to and at a predetermined distance from the metal component first end; positioning at least one joining assembly component proximate to the composite component first end and the metal component first end, with the joining assembly component dimensioned to join the composite component first end and the metal component first end, and with the joining assembly component comprising a joining assembly component inner surface and a barrier, with the barrier extending from the joining assembly component inner surface, with the barrier dimensioned to substantially separate the composite first end from the metal component first end, with the barrier comprising a barrier edge; substantially covering said barrier edge with a barrier edge seal; fastening the composite component first end to the joining assembly component; and fastening the metal component first end to the joining assembly component at a predetermined distance from the composite component first end.

Another aspect of the present disclosure is directed to a method presented immediately above wherein, after the step of fastening the composite component first end to the joining assembly component further comprising further comprising establishing a first chamber, with the first chamber bounded by the barrier, the joining assembly component inner surface and a composite component edge seal, with the barrier edge positioned proximate to the joining assembly component inner surface; and further comprising establishing a second chamber, said second chamber bounded by the barrier, the joining assembly component inner surface and the metal component first end, with the barrier edge positioned proximate to the joining assembly component inner surface.

In a further aspect, in the step of positioning a joining assembly proximate to the composite component first end and the metal component first end, the joining assembly comprises a joining assembly first plate and a second joining assembly second plate.

In another aspect, in the step of positioning a joining assembly component proximate to the composite component first end and the metal component first end, the joining assembly first plate and joining assembly second plate are joined together to retain the composite component first end and the metal component first end between the joining assembly first plate and the joining assembly second plate.

In another aspect, in the step of positioning a joining assembly proximate to the composite component first end and the metal component first end, at least one of the joining assembly first plate and joining assembly second plate comprising titanium or a titanium alloy.

In another aspect, in the step of positioning a composite component in a first plane, the composite component comprises a carbon fiber reinforced polymer.

In a further aspect, in the step positioning a metal component in the second plane, the metal component comprises aluminum or an aluminum alloy.

A further aspect of the present disclosure is directed to a method for joining a composite component to a metal component via a joining assembly comprising positioning a composite component in a first plane; with the composite component comprising a composite component first end, and a composite component second end; substantially covering said composite component first end with a composite edge seal; positioning a metal component in the first plane or in a second plane, with the metal component having a metal component first end and a metal component second end, wherein the second plane may be aligned with the first plane; positioning said composite component first end proximate to and at a predetermined distance from the metal component first end; positioning a joining assembly first plate and a joining assembly second plate proximate to the composite component first end and the metal component first end, with the joining assembly first plate and joint assembly second plate dimensioned to join the composite component first end and the metal component first end, and with the joining assembly first plate comprising a joining assembly first plate inner surface and a joint assembly second plate inner surface comprising a barrier, with the barrier extending from at least one of the joining assembly first plate inner surface and the joint assembly second plate inner surface, said barrier dimensioned to substantially separate the composite first end from the metal component first end, with the barrier comprising a barrier edge; substantially covering said barrier edge with a barrier edge seal; fastening the composite component first end to the joining assembly first plate and the joining assembly second plate; and fastening the metal component first end to the joining assembly first plate and the joining assembly second plate at a predetermined distance from the composite component first end; wherein moisture is inhibited from contacting the composite component first end.

A further aspect of the present disclosure is directed to a joining assembly for joining a composite component to a metal component comprising a composite component configured in a first plane, with the composite component comprising a composite component first end, and a composite component second end and a composite edge seal configured to substantially cover the composite component first end; a metal component configured in the first plane or in a second plane, said metal component having a metal component first end and a metal component second end, wherein the second plane may be aligned with the first plane, and with the metal component first end positioned proximate to and at a predetermined distance from the composite component first end; at least a joining assembly first plate positioned proximate to the composite component first end and the metal component first end, with the joining assembly first plate dimensioned to join the composite component first end and the metal component first end, and with the joining assembly first plate comprising a barrier dimensioned to substantially separate the composite first end from the metal component first end, and with the barrier comprising a barrier edge; and a barrier edge seal configured to substantially cover the barrier edge.

In another aspect, the composite component comprises a fiber-reinforced polymer.

In another aspect, the composite component comprises a carbon fiber-reinforced polymer.

In a further aspect, the metal component comprises aluminum or an aluminum alloy.

In another aspect, the barrier comprises titanium or a titanium alloy.

In a further aspect, the barrier is integral with a joining assembly component.

In another aspect, the barrier is integral with at least one of the joining assembly first plate or the joining assembly second plate.

In another aspect, the joining assembly first plate comprises titanium or a titanium alloy.

In a further aspect, the joining assembly comprises a joining assembly first plate and a second joining assembly second plate configured to retain the composite component first end and the metal component first end between the joining assembly first plate and the joining assembly second plate.

In a further aspect, the fiber-reinforced polymer comprises a fiber-containing epoxy resin.

In another aspect, the joining assembly is configured to inhibit moisture from contacting the composite component first end.

A further aspect of the present disclosure is directed to a joint for an aircraft, with the joint comprising a joining assembly for joining a composite component to a metal component comprising a composite component configured in a first plane, with the composite component comprising a composite component first end, and a composite component second end and a composite edge seal configured to substantially cover the composite component first end; a metal component configured in the first plane or in a second plane, said metal component having a metal component first end and a metal component second end, with the second plane equal to or different from said first plane, and with the metal component first end positioned proximate to and at a predetermined distance from the composite component first end; at least a joining assembly first plate positioned proximate to the composite component first end and the metal component first end, with the joining assembly first plate dimensioned to join the composite component first end and the metal component first end, and with the joining assembly first plate comprising a barrier dimensioned to substantially separate the composite first end from the metal component first end, and with the barrier comprising a barrier edge; and a barrier edge seal configured to substantially cover the barrier edge.

Another aspect of the present disclosure is directed to a vehicle comprising a joining assembly for joining a composite component to a metal component comprising a composite component configured in a first plane, with the composite component comprising a composite component first end, and a composite component second end and a composite edge seal configured to substantially cover the composite component first end; a metal component configured in the first plane or in a second plane, said metal component having a metal component first end and a metal component second end, with the second plane equal to or different from said first plane, and with the metal component first end positioned proximate to and at a predetermined distance from the composite component first end; at least a joining assembly first plate positioned proximate to the composite component first end and the metal component first end, with the joining assembly first plate dimensioned to join the composite component first end and the metal component first end, and with the joining assembly first plate comprising a barrier dimensioned to substantially separate the composite first end from the metal component first end, and with the barrier comprising a barrier edge; and a barrier edge seal configured to substantially cover the barrier edge with the vehicle selected from the group consisting of a manned aircraft, an unmanned aircraft, a manned spacecraft, an unmanned spacecraft, a manned rotorcraft, an unmanned rotorcraft, a satellite, a rocket, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and combinations thereof.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

According to aspects of the present disclosure, a joining assembly is provided for commonly securely and otherwise connecting non-metal components and metal components. More particularly, joints and joining assemblies are disclosed for commonly joining composite components in a joining assembly with a metal component including, for example, aluminum or an aluminum alloy component.

For the purpose of this disclosure, composite components are understood to include materials comprising a plurality of layers to comprise a laminate. Composite laminates comprise layers made from fibers impregnated with thermosetting resins (e.g. prepregs or prepreg plys) that are formed into predetermined shapes and cured to comprise component parts.

Contemplated fibers used to make the composite components include, without limitation, carbon fibers, glass fibers, polymer fibers, boron fibers, aramid fibers, etc.

Thermosetting resins used to impregnate the contemplated fibers include epoxy-based systems, acrylate-based systems, etc., and other thermoset or thermoplastic polymers including, for example, polyester, vinyl ester, nylon, etc.

One preferred family of composite materials are the carbon fiber reinforced polymers, also known as carbon fiber-reinforced plastic, carbon fiber-reinforced thermoplastic, graphite-reinforced polymer, graphite fiber-reinforced polymer, etc. Such terms may be substituted for one another, and are used equivalently herein for purposes of the present disclosure and are collectively referred to herein as "CFRPs". CFRPs are extremely strong and light-weight, and have a high strength-to-weight ratio. CFRPs have found utility as component parts in the aerospace field. The CFRP composite materials contemplated according to the present disclosure may also comprise other fibers including aramid, aluminum, ultra-high-molecular-weight polyethylene (UHMWPE), glass fibers, etc. Preselected additives introduced into the binding matrix of the resin can impact and otherwise serve to tailor the desired properties of the CFRPs, and such additives may include, silica, rubber, carbon nanotubes, etc. Contemplated component parts made with the contemplated CFRPs include, without limitation, stringers, spars, ribs, skins, etc.

According to aspects of the present disclosure, moisture build-up in or on the composite component is substantially reduced or substantially eliminated by providing at least one physical barrier in the joining assembly used to connect a composite component to a metal (e.g. aluminum and aluminum alloy) component. In addition to the physical barrier itself presented in the joint, sealant is provided in the form of an edge seal to seal the exposed end of the composite component in the joint. In addition, sealant is provided at least to the edge of the barrier as a barrier edge seal to form a further separation seal. The sealant provided to the barrier edge contacts adjoining features in the joining assembly and effectively forms a substantially-sealed first chamber bounded by the barrier, the composite component edge also sealed with sealant, and surfaces of the joining assembly (e.g. inner, or inner surfaces of the joining assembly first and second or "upper" and "lower" plates depending upon the orientation of the joining assembly, etc.). The first chamber serves to isolate and otherwise separate the composite component edge from the metal component edge within the joint. Such a chamber serves to both inhibit the entry and collection of moisture from contacting the composite component end, and also ensures that any moisture that does still develop within the chamber does not pass to, and otherwise contact the metal component.

According to aspects of the present disclosure, the barrier in the joining assembly comprising an edge seal further serves to establish a second chamber bounded by the barrier, the metal component edge and features of the joining assembly (e.g. inner, or inner surfaces of the joining assembly first and second or "upper" and "lower" plates depending upon the orientation of the joining assembly, etc.).

Therefore, aspects of the present disclosure electrically isolate the composite component (e.g. CFRP component) from the co-joined metal component (e.g. aluminum or aluminum alloy component) for at least the purpose of substantially reducing or substantially eliminating corrosion (e.g. corrosion due to galvanic corrosion of the metal component due to exposure of fiber such as carbon fibers from CFRPs that may otherwise be exposed from the composite component but for the application of sealant to the composite component edge) of the metal component, or conversely, significantly increasing corrosion protection of the metal component.

The barrier may be made from any desired material, and may be integral with one or more structures of the joining assembly (e.g. integral with at least one joining assembly first plate or joining assembly second plate of the joining assembly). According to one aspect of the present disclosure, the barrier may therefore be made from the same material used to make parts of a joining assembly used to construct a desired joint. In other words, according to a contemplated aspect, when titanium or titanium alloys are used to make, for example, upper or lower joining assembly plates (also referred to equivalently herein as joining assembly first plates and joining assembly second plates) for a joint, it is contemplated that the barrier will also comprise titanium or a titanium alloy, and the barrier will extend a predetermined distance substantially perpendicularly from, or at any desired angle relative to the plane of, the upper or lower joining assembly plates. See FIG. 1A.

In further contemplated aspects, the barrier may be integral with and may extend from the surfaces of both the first and second (e.g. upper and lower) joining assembly plates. In this contemplated configuration, two partial barriers, one each extending from an upper and lower joining assembly plate will substantially align such that an edge seal comprising a sealant is applied to the edge of at least one barrier, and will contact the edges of both barrier parts. In this way the sealant is disposed between the edges of the two barriers to essentially form a single barrier. See FIG. 1B.

According to further aspect of the present disclosure, the barrier itself may be a discrete component (e.g. not integral with at least one upper or lower joining surfaces or plates of the joining assembly) and may be oriented at any angle as desired, and the barrier may be configured to receive, or otherwise come into contact with, an amount of sealant as an edge seal. The barrier is understood to contribute to the formation a boundary of a substantially sealed chamber that isolates a composite component end from a metal component end. See FIG. 1C.

According to the present disclosure, the contemplated joining assembly may, for example, be a butt joint, including the type of joint used in aircraft assemblies for joining component parts, including, for example and without limitation, joining assemblies associated with joints.

The physical barrier feature contemplated in aspects of the present disclosure obviates the need for additional parts or layers that may previously have been used to surround, isolate or otherwise contact co-joined (and otherwise proximately-positioned) composite components and metal components to counteract or otherwise thwart the effects of corrosion (e.g. galvanic corrosion) of the metal component co-joined with the composite component in a joining assembly. The addition of the physical barrier and the presence of the edge seals serve to lower overall weight of the joining assemblies disclosed herein, as well as reduce the overall number of parts, reduce the complexity of the joining assemblies, and reduce manufacturing steps and complexity, etc. The advantages presented in connection with the contemplated joining assemblies further substantially reduce or substantially eliminate corrosion of the metal components, increasing the service life of the joining assemblies and the metal components joined therein, all of which serves to reduce cost of operating and maintaining the structures comprising such joining assemblies (e.g. larger assemblies for, as well the aircraft itself, etc.) Still further, the establishment of substantially sealed chambers provides sites for, and otherwise simplifies and facilitates routine inspections of the composite and metal component ends joined in a joining assembly.

The sealant(s) contemplated for use as barrier edge seals and composite component edge seals comprise viscous silicone-containing materials that may comprise rubbers, and that are able, if desired, to cure in ambient conditions. Contemplated sealants therefore include, without limitation, rubber-like sealants that may comprise polymers such as silicone, nylon, etc. Such contemplated sealants may be one-part or two-part sealants of the type typically used as, for example, sealants used in connection with sealing aircraft components. Such commercially available sealants include Pro-Seal 890 (Classes A—brush application; B—fillet and injection seal; C—faying surfaces), Pro-Seal PR-1776 (Classes A—brush application; B—fillet and injection seal; C—faying surfaces)—(PPG Aerospace, Woodinville, Wash.), etc. It is further contemplated that aspects of the present invention may incorporate a polymer edge seal alone, a polymer edge seal with a sealant, and/or a sealant alone.

The contemplated metal component co-joined with the composite-containing component in the joining assemblies of the present disclosure comprise any suitable metal and metal alloy, with aluminum and aluminum-containing alloys being contemplated, due to the weight and strength advantages imparted to the overall structure of, for example, vehicles, including aircraft, etc. Representative aluminum and aluminum alloys include, for example, aluminum alloys 2024, 2099, 7050 and 7475.

For the purpose of the present disclosure, it is understood that the term joining assembly component comprises plates that include a joining assembly first plate and a joining assembly second plate.

Figure 1A:
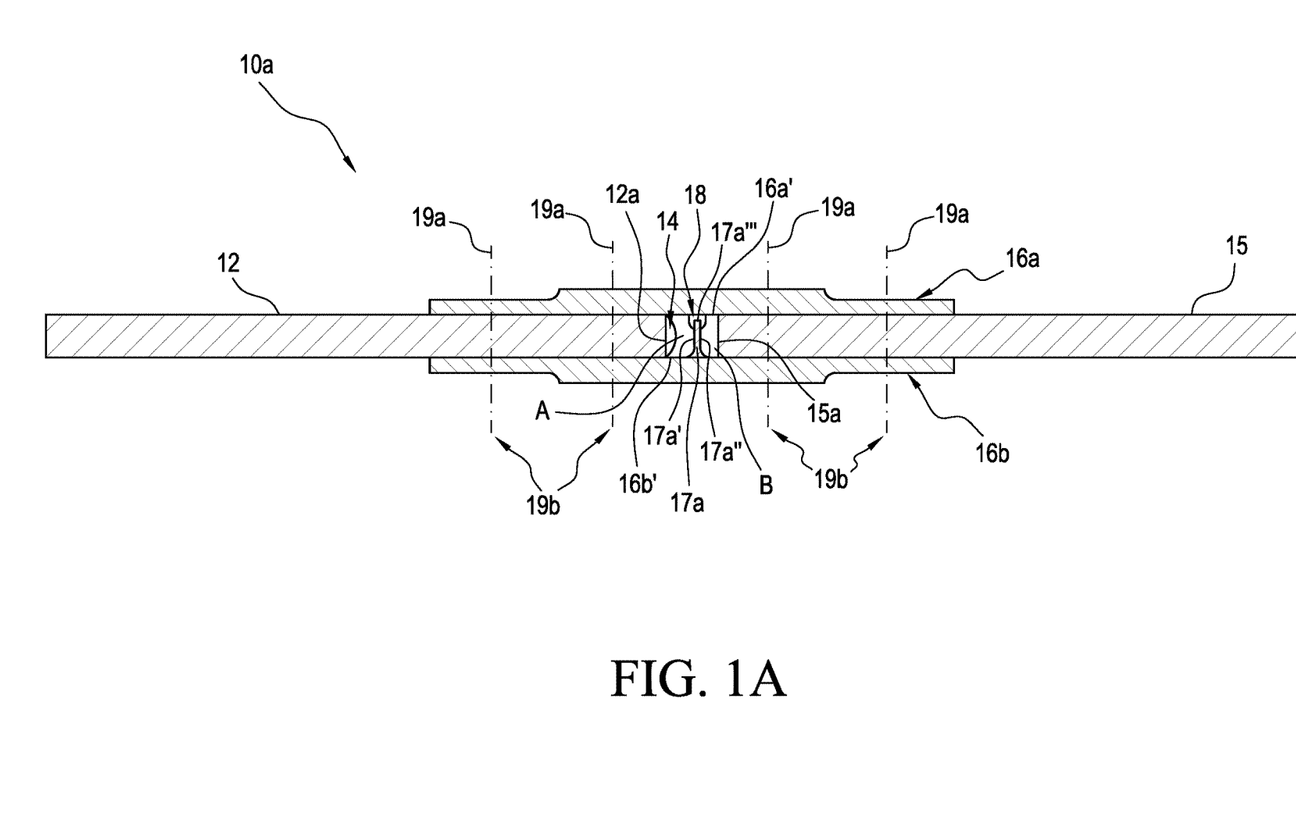
FIG. 1A is a cross-sectional side view of a joining assembly according to an aspect of the present disclosure.

FIG. 1A is a cross-sectional side view of an aspect of the present disclosure showing a joining assembly 10a comprising a composite component 12 having a composite component first end 12a with a composite component edge seal 14 substantially covering the composite component first end 12a. A metal component 15 is shown having a metal component first end 15a. The composite component 12 and the metal component 15 are shown oriented in a joining assembly 10a, with the joining assembly 10a comprising a joining assembly first plate 16a and a joining assembly second plate 16b. The composite component 12 and the metal component 15 are shown positioned between the joining assembly first plate 16a and a joining assembly second plate 16b. As shown in FIG. 1A, joining assembly second plate 16b comprises a barrier 17a, with the barrier 17a comprising a barrier edge seal 18 substantially covering barrier end 17a'''. Barrier edge seal 18 as shown contacts an inner surface of the joining assembly first plate 16a. In this way, a first chamber "A" is shown formed and bounded by a joining assembly first plate inner (e.g. interior) surface 16a', a joining assembly second plate inner (e.g. interior) surface 16b' of the joining assembly second plate, a barrier first surface 17a' of the barrier 17a and composite component edge seal 14. A second chamber "B" is shown formed and bounded by the joining assembly first plate inner surface 16a', the joining assembly second plate inner surface 16b', a barrier second surface 17a'' of the barrier 17a and the edge of metal component first end 15a of metal component 15. Although the orientation of the barrier in FIG. 1A depicts the barrier 17a as extending upwardly from and may be integral with joining assembly second plate 16b, the present disclosure contemplates an inverted orientation whereby (although not shown), the barrier 17a may extending downward from, and may be integral with joining assembly first plate 16a.

Figure 1B:
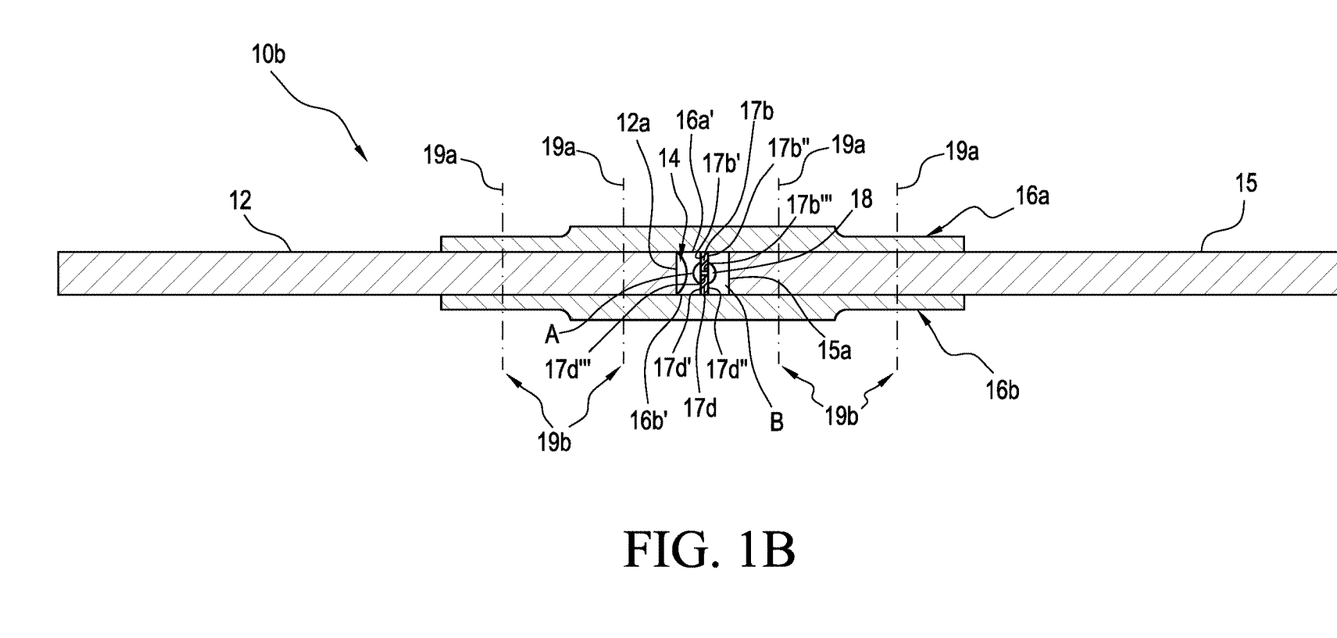
FIG. 1B is a cross-sectional side view of a joining assembly according to an aspect of the present disclosure.

FIG. 1B is a cross-sectional side view of an aspect of the present disclosure showing a joining assembly 10b comprising a composite component 12 having a composite component first end 12a with a composite component edge seal 14 substantially covering the composite component first end 12a. A metal component 15 is shown having a metal component first end 15a. The composite component 12 and the metal component 15 are shown oriented in a joining assembly 10b, with the joining assembly 10b comprising a joining assembly first plate 16a and a joining assembly second plate 16b. The composite component 12 and the metal component 15 are shown positioned between the joining assembly first plate 16a and a joining assembly second plate 16b.

As shown in FIG. 1B, barrier 17b is shown as extending vertically downward from, and is an integral part of joining assembly first plate 16a. Barrier 17d is shown as extending vertically upward from, and is an integral part of joining assembly second plate 16b. An amount of barrier edge seal 18 is shown covering the barrier ends 17b''', 17d''' of barriers 17b and 17d respectively. A gap may therefore exist between barrier ends 17b''', 17d''', with the barrier edge seal 18 filling in any such gap. Together, barrier 17b, barrier 17d, and the barrier edge seal 18 form a barrier substantially equivalent in function to the barrier 17a and barrier edge seal 18 as shown in FIG. 1A. In this way, a first chamber "A" is shown formed and bounded by an inner (e.g. interior) surface 16a' of the joining assembly first plate, an inner surface 16b' of the joining assembly second plate, a surface of the barriers 17b', 17d', barrier edge seal 18, and composite component edge seal 14. A second chamber "B" is shown formed and bounded by an inner surface 16a' of the joining assembly first plate, an inner surface 16b' of the joining assembly second plate, a surface of barriers 17b', 17d''', barrier edge seal 18, and the edge of metal component first end 15a of metal component 15.

Figure 1C:
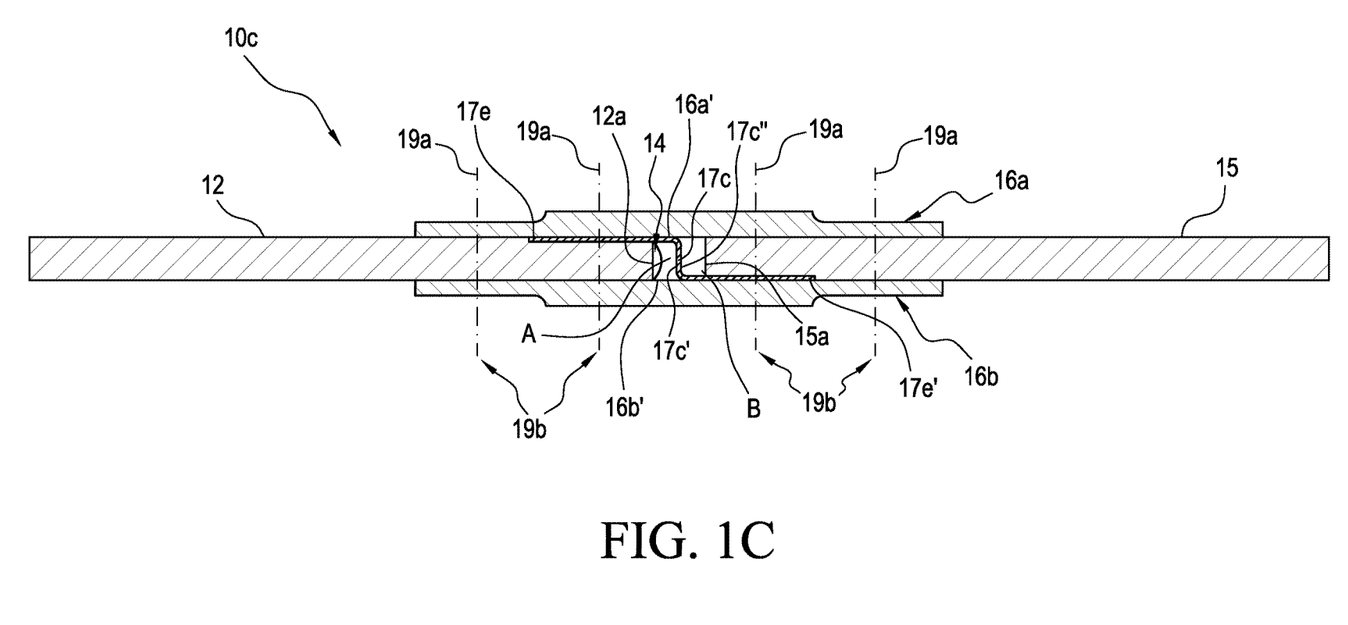
FIG. 1C is a cross-sectional side view of a joining assembly according to an aspect of the present disclosure.

FIG. 1C is a cross-sectional side view of an aspect of the present disclosure showing a joining assembly 10c comprising a composite component 12 having a composite component first end 12a with a composite component edge seal 14 substantially covering the composite component first end 12a. A metal component 15 is shown having a metal component first end 15a. The composite component 12 and the metal component 15 are shown oriented in the joining assembly 10c, with the joining assembly 10c comprising a joining assembly first plate 16a and a joining assembly second plate 16b. The composite component 12 and the metal component 15 are shown positioned between the joining assembly first plate 16a and a joining assembly second plate 16b. As shown in FIG. 1C, joining assembly 10c comprises a barrier 17c. The barrier first end 17e of barrier 17c is shown disposed between the joining assembly first plate 16a and the composite component 12. The barrier second end 17e' of barrier 17c is shown disposed between joining assembly second plate 16b and the metal component 15. An intermediate section of barrier 17c is shown disposed between joining assembly first plate inner surface 16a' and joining assembly second plate inner surface 16b'. It is understood that a reverse orientation of the barrier 17c is contemplated (though not shown) with the barrier first end 17e of the barrier 17c disposed between joining assembly second plate 16b and the composite component 12, and the barrier second end 17e' of barrier 17c disposed between joining assembly first plate 16a and the metal component 15. Although not shown in FIG. 1C, it is understood that a predetermined amount of barrier edge seal may be disposed at interfaces where the barrier 17c contacts either or both of the joining assembly first plate 16a inner surface 16a' and/or the joining assembly second plate 16b inner surface 16b'. In this way, a first chamber "A" is shown formed and bounded by an inner (e.g. interior) surface 16a' of the joining assembly first plate, an inner surface 16b' of the joining assembly second plate, a barrier first surface 17c' of the barrier 17c and composite component edge seal 14. A second chamber "B" is shown formed and bounded by an inner surface 16a' of the joining assembly first plate, an inner (e.g. interior) surface 16b' of the joining assembly second plate, a barrier second surface 17c'' of the barrier 17c and the edge of metal component first end 15a of metal component 15. It is understood that an intermediate section of barrier 17c may be disposed, for example, vertically, or diagonally, or at any desired practical angle, so long as it is disposed in an orientation that serves to separate the composite component first end 12a from the metal component first end 15a of metal component 15 within the joining assembly 10c.

As shown in FIGS. 1A, 1B and 1C, joining assembly first plate 16a is understood to be fastened to joining assembly second plate 16b by a predetermined number of fasteners such as bolts 19a that are dimensioned to engage securely with corresponding nuts 19b. Any type of fasteners made from any desired materials are contemplated according to aspects of the present disclosure, so long as such fasteners are able to be configured to join together, and apply a predetermined amount of compressive force on composite component 12 and metal component 15 to hold composite component 12 and metal component 15 in place securely to insure predetermined performance of such components in use, such as, for example, use in a butt joint joining assembly found, for example, in an aircraft. For the purpose of this application, the term "fastening" (and the term "fastened") comprises and is otherwise properly interpreted to include and indicate not only the process of joining components via the use of discrete physical fasteners as described above, but also the processes of bonding and/or gluing (e.g. components "bonded" and "glued") with or without the use of discrete physical fasteners.

Figure 2:
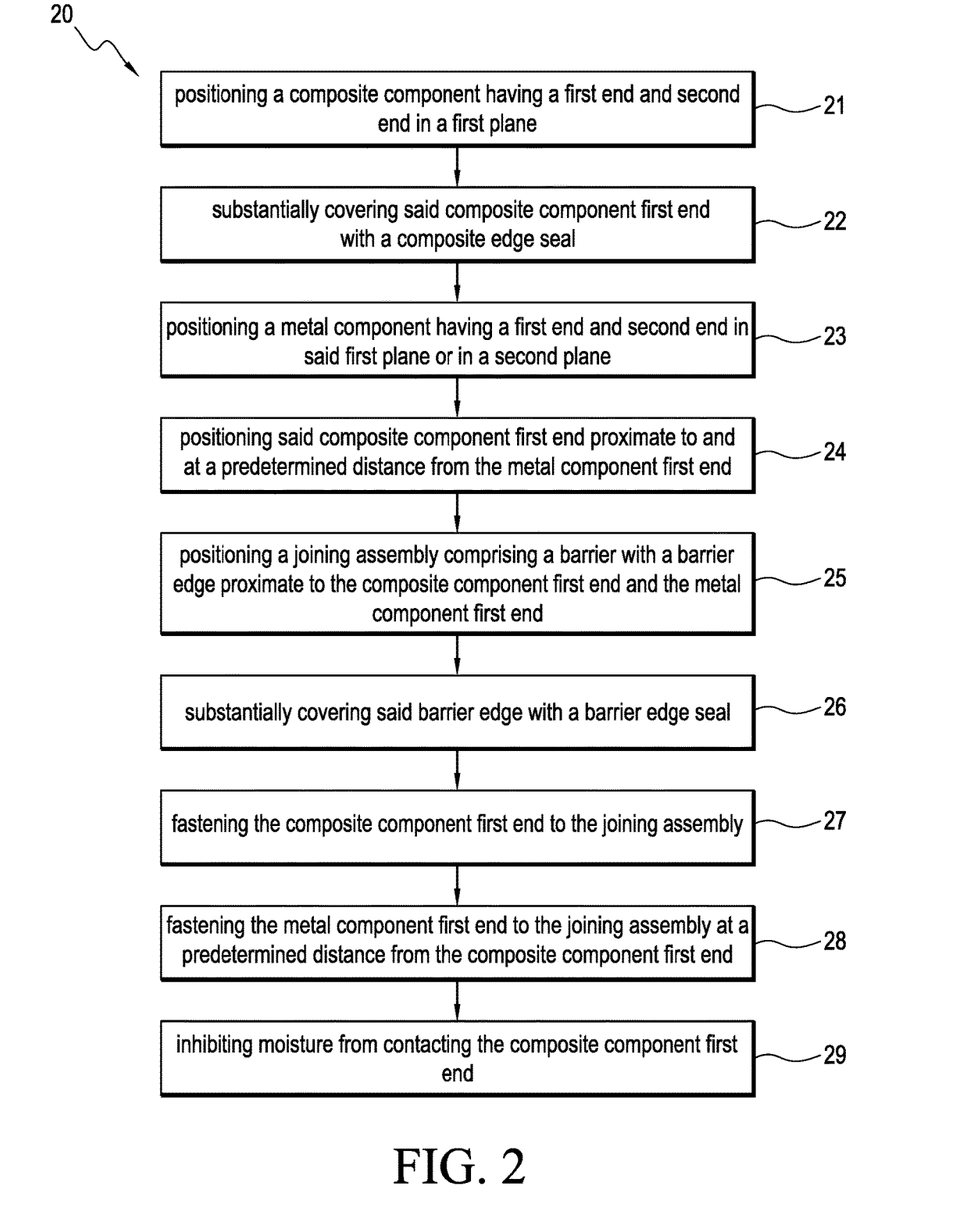
FIG. 2 is a flow chart outlining a method according to an aspect of the present disclosure.

FIG. 2 is a flowchart outlining an aspect of the present disclosure comprising a method 20 for joining a composite component to a metal component comprising 21 positioning a composite component having a first end and a second end, with the composite component oriented in a first plane; substantially covering 22 the composite component first end with a composite edge seal; positioning 23 a metal component having a first end and a second end, with the metal component oriented in the first plane or in a second plane (with the second plane being equal to different from the first plane); positioning 24 the composite component first end proximate to and a predetermined distance from the metal component; positioning 25 a joining assembly comprising a barrier (with the barrier comprising a barrier edge) proximate to the composite component first end and the metal component first end; substantially covering 26 the barrier edge with a barrier edge seal; fastening 27 the composite component first end to the joining assembly and fastening 28 the metal component first end to the joining assembly (with steps 27 and 28 taking place in no particular order relative to one another); and inhibiting 29 moisture from contacting the composite component first end.

Aspects of the present disclosure may, of course, be carried out in other ways than those specifically set forth herein without departing from essential characteristics of the disclosed aspects. The present aspects are to be considered in all respects as illustrative and not restrictive, and all changes coming within the meaning and equivalency range of the appended claims are intended to be embraced therein.

What is claimed is:

1. A method for joining a composite component to a metal component via a joining assembly comprising:
    positioning a composite component in a first plane, said composite component comprising a composite component first end, and a composite component second end;
    substantially covering said composite component first end with a composite edge seal;
    positioning a metal component in said first plane or in a second plane, said metal component having a metal component first end and a metal component second end, wherein said second plane may be aligned with said first plane;
    positioning said composite component first end proximate to and at a predetermined distance from the metal component first end;
    positioning at least one joining assembly component proximate to the composite component first end and the metal component first end, said joining assembly dimensioned to join the composite component first end and the metal component first end, and said joining assembly component comprising a joining assembly component inner surface and a barrier extending from the joining assembly component inner surface, said barrier dimensioned to substantially separate the composite component first end from the metal component first end, said barrier comprising a barrier edge;
    substantially covering said barrier edge with a barrier edge seal;
    fastening the composite component first end to the joining assembly; and
    fastening the metal component first end to the joining assembly at a predetermined distance from the composite component first end to join the composite component to the metal component via the joining assembly.

2. The method of claim 1, wherein, after the step of fastening the composite component first end to the joining assembly component further comprising:
    establishing a first chamber, said first chamber bounded by the barrier, the joining assembly component inner surface and a composite component edge seal, said barrier edge positioned proximate to the joining assembly component inner surface; and
    establishing a second chamber, said second chamber bounded by the barrier, the joining assembly component inner surface and the metal component first end, said barrier edge positioned proximate to the joining assembly component inner surface.

3. The method of claim 1, wherein, in the step of positioning at least one joining assembly component proximate to the composite component first end and the metal component first end, said joining assembly comprises a joining assembly first plate and a joining assembly second plate.

4. The method of claim 3, wherein, in the step of positioning at least one joining assembly component proximate to the composite component first end and the metal component first end, the joining assembly first plate and the joining assembly second plate are joined together to retain the composite component first end and the metal component first end between the joining assembly first plate and joining assembly second plate.

5. The method of claim 4, wherein, in the step of positioning at least one joining assembly component proximate to the composite component first end and the metal component first end, the joining assembly first plate and the joining assembly second plate comprise titanium or a titanium alloy.

6. The method of claim 1, wherein, in the step positioning a composite component in a first plane, the composite component comprises a carbon fiber reinforced polymer.

7. The method of claim 1, wherein, in the step positioning a metal component in said second plane, the metal component comprises aluminum or an aluminum alloy.

8. A method for joining a composite component to a metal component via a joining assembly comprising:
    positioning a composite component in a first plane, said composite component comprising a composite component first end, and a composite component second end;
    substantially covering said composite component first end with a composite edge seal;
    positioning a metal component in said first plane or in a second plane, said metal component having a metal component first end and a metal component second end, wherein said second plane may be aligned with said first plane;
    positioning said composite component first end proximate to and at a predetermined distance from the metal component first end;
    positioning a joining assembly first plate and a joining assembly second plate proximate to the composite component first end and the metal component first end, said joining assembly first plate and said joining assembly second plate dimensioned to join the composite component first end and the metal component first end, and said joining assembly first plate comprising a joining assembly first plate inner surface, said joining assembly second plate comprising a joining assembly second plate inner surface, and a barrier extending from at least one of the joining assembly first plate inner surface and the joining assembly second plate inner surface, said barrier dimensioned to substantially separate the composite component first end from the metal component first end, said barrier comprising a barrier edge;
    substantially covering said barrier edge with a barrier edge seal;
    fastening the composite component first end to the joining assembly; and fastening the metal component first end to the joining assembly at a predetermined distance from the composite component first end;

wherein moisture is inhibited from contacting the composite component first end.

9. A joining assembly for joining a composite component to a metal component comprising:

a composite component configured in a first plane, said composite component comprising:
   a composite component first end, and a composite component second end; and
   a composite edge seal configured to substantially cover the composite component first end;

a metal component configured in the first plane or in a second plane, said metal component comprising: a metal component first end and a metal component second end, wherein said second plane may be aligned with said first plane; said metal component first end positioned proximate to and at a predetermined distance from the composite component first end;

a joining assembly positioned proximate to the composite component first end and the metal component first end, said joining assembly dimensioned to join the composite component first end and the metal component first end, and said joining assembly comprising a barrier dimensioned to substantially separate the composite component first end from the metal component first end, said barrier comprising a barrier edge; and a barrier edge seal configured to substantially cover the barrier edge.

10. The joining assembly of claim 9, wherein the composite component comprises a fiber-reinforced polymer.

11. The joining assembly of claim 9, wherein the metal component comprises aluminum or an aluminum alloy.

12. The joining assembly of claim 9, wherein the barrier comprises titanium or a titanium alloy.

13. The joining assembly of claim 9, wherein the joining assembly comprises titanium or a titanium alloy.

14. The joining assembly of claim 9, wherein the joining assembly is configured such that moisture is inhibited from contacting the composite component first end.

15. A joining assembly for an aircraft comprising the joining assembly of claim 9.

16. A vehicle comprising the joining assembly of claim 9, said vehicle selected from the group consisting of:
   a manned aircraft, an unmanned aircraft, a manned spacecraft, an unmanned spacecraft, a manned rotorcraft, an unmanned rotorcraft, a satellite, a rocket, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and combinations thereof.

17. The joining assembly of claim 10, wherein the composite component comprises a fiber-containing epoxy resin.

18. The joining assembly of claim 9, further comprising a joining assembly first plate and a joining assembly second plate, said joining assembly first plate and joining assembly second plate configured to retain the composite component first end and the metal component first end between the joining assembly first plate and the joining assembly second plate.

19. The joining assembly of claim 9, wherein the composite component comprises a carbon fiber-reinforced polymer.

20. The joining assembly of claim 16, wherein the barrier is integral with at least one of a joining assembly first plate and a joining assembly second plate.

* * * * *

UNITED STATES PATENT AND TRADEMARK OFFICE
CERTIFICATE OF CORRECTION

PATENT NO. : 9,964,131 B1
APPLICATION NO. : 15/581553
DATED : May 8, 2018
INVENTOR(S) : Mohssen Mohaghegh It is certified that error appears in the above-identified patent and that said Letters Patent is hereby corrected as shown below:

In the Claims

Claim 2, Column 11, Lines 61-62, delete "the joining assembly component further comprising" and insert --the joining assembly component, further comprising--, therefor.

Claim 6, Column 12, Line 25, delete "in the step positioning" and insert --in the step of positioning--, therefor.

Claim 7, Column 12, Line 28, delete "in the step positioning" and insert --in the step of positioning--, therefor.

Claim 7, Column 12, Line 29, delete "in said second plane" and insert --in a second plane--, therefor.

Claim 20, Column 14, Lines 33-34, delete "a joining assembly first plate and a joining assembly second plate" and insert --a joining assembly first plate and the joining assembly second plate--, therefor.

Signed and Sealed this
Fifth Day of June, 2018

Andrei Iancu
*Director of the United States Patent and Trademark Office*